United States Patent [19]

Bonnet

[11] E Re. 28,464

[45] Reissued July 8, 1975

[54] MAGNETIC SUSPENSION FLOWMETERS

[75] Inventor: Jean-Loup Bonnet, par Verrieres le Buisson, France

[73] Assignee: Schlumberger Technology Corporation, New York, N.Y.

[22] Filed: Apr. 17, 1974

[21] Appl. No.: 425,907

Related U.S. Patent Documents

Reissue of:

[64] Patent No.: 3,630,078
Issued: Dec. 28, 1971
Appl. No.: 872,971
Filed: Oct. 31, 1969

[52] U.S. Cl. ..... 73/155; 73/229
[51] Int. Cl. ..... E21b 47/00
[58] Field of Search ..... 73/155, 229, 231; 175/48

[56] References Cited

UNITED STATES PATENTS

| | | | |
|---|---|---|---|
| 2,741,917 | 4/1956 | Piety et al. | 73/155 |
| 2,962,895 | 12/1960 | Rumble | 73/155 |
| 3,036,460 | 5/1962 | White et al. | 73/155 |
| 3,039,302 | 6/1962 | Willis | 73/155 |
| 3,454,085 | 7/1969 | Bostock | 166/66 |

*Primary Examiner*—Jerry W. Myracle
*Attorney, Agent, or Firm*—Ernest R. Archambeau, Jr.; William R. Sherman; Stewart F. Moore

[57] ABSTRACT

An illustrative embodiment of the present invention includes apparatus for making measurements of the rate of fluid flow in a producing well. The apparatus includes a body, a folding blade screw or spinner mounted on a shaft turning in the body and a blade-closing mechanism. The screw is mounted so that in operation its axis of rotation is suspended in a magnetic field which also provides an axial vibration to largely overcome the effects of static and dynamic friction on its motion.

21 Claims, 8 Drawing Figures

MAGNETIC SUSPENSION FLOWMETERS

Matter enclosed in heavy brackets [ ] appears in the original patent but forms no part of this reissue specification; matter printed in italics indicates the additions made by reissue.

BACKGROUND OF THE INVENTION

This invention relates to turbine flowmeters used in drilling and more particularly to packerless flowmeters having an extendible spinner.

In producing wells, it is of great importance, for the study of the different productive zones, to know the average flow of the fluid at various depths. This average flow is generally measured by means of a spinner flowmeter introduced into the well at the end of a cable. These flowmeters must be able to pass through a production tubing string whose diameter is smaller than the area in which the measurement is made. Certain apparatus used for the measurement of low fluid flow rates have an inflatable ring plug or packer which forces the fluid to pass through a cross section of a reduced diameter in which a measurement screw or spinner is placed. For large flow rates, it is no longer practical to use the packer devices because of the upward thrust of the flowing fluid, and continuous flowmeter apparatus is used. In this apparatus the screw intercepts only a portion of the flowing fluid cross section.

In continuous flowmeters, large diameter screws with folding blades are sometimes used. The larger screw produces a higher torque which enables lowering the working threshold for low flow rates. In polyphase flow, i.e., when the flowing fluid is a mixture of water, oil and gas, the sampling is better and less sensitive to relative or sliding velocities between fluid phases. Moreover, the greater inertia of the screw allows integrating the movement of the fluid and obtaining a better measurement of the average velocity.

Typically, such apparatus includes a body which is sized for passage in the well bore, means for centering the device in the borehole and a folding blade screw mounted on a rotating axle and a blade-closing mechanism.

In such an apparatus the working threshold is limited by the static and kinetic friction which exists in the suspension bearings of the screw despite elaborate care taken in their manufacture. These bearings are, moreover, exposed to the borehole fluids which generally contain a variety of well debris which may be detrimental to the rotation. Finally, the blades of the screw which are relatively fragile, may be damaged if the apparatus encounters a stricture or narrow portion of borehole during the measurement or upon passing into the well.

Accordingly, an object of this invention is to provide a flowmeter with folding screw in which the suspension of the screw allows rotation with much less friction than previously attained.

Another object of the invention is to provide a screw or spinner type flowmeter whose blades close automatically when the apparatus encounters a bottleneck or stricture in the borehole.

In accordance with the objects of the invention, a flowmeter is provided for the study of producing wells. The flowmeter includes a body, a folding blade screw or spinner mounted on a shaft turning in the body and a blade closing mechanism. The shaft has a ferromagnetic metal part which passes through a coil attached to the body member. The coil is capable of being supplied with current in such a way as to suspend with minimum friction, the shaft at the center of the coil.

Another feature of the invention includes providing a current to the coil having a DC component and an AC component so as to give the shaft, besides an average suspension force, an axial vibrational movement. The blade-closing mechanism is constituted of a centering device having a ring sliding on the body. Movement of this ring which is connected by a hydraulic transmission to the shaft allows closing the blades when the centering device enters a section of well bore or tubing having a diameter smaller than a predetermined value.

Other objects and advantages of the invention together with details of its operation may best be understood by reference to the following description and the drawings in which:

DESCRIPTION OF THE PREFERRED EMBODIMENT

Figure 1:
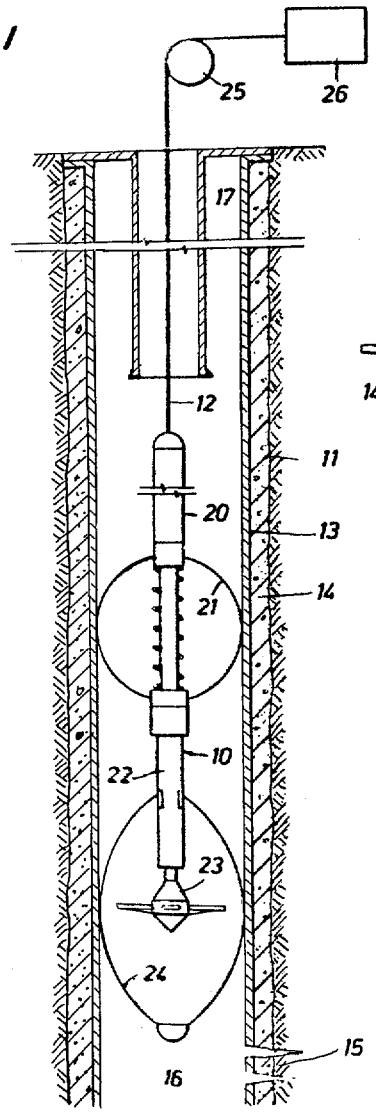
FIG. 1 is an overall view of the flowmeter, according to the invention, represented in a well borehole.

Referring to FIG. 1, a probe 10 is suspended in a well bore 11 by means of a cable 12, generally armoured, and containing a single, insulated conductor or multiple conductors if desired.

The borehole 11 generally has at least a portion of its depth protected with steel casing 13 held in place by cement 14. The casing 13 and the cement 14 have perforations 15 through which flows a fluid produced by the neighboring formation according to the direction of arrows 16. A production tubing string 17 is located inside the casing 13 in the usual manner.

The probe 10 is formed of an upper section 20, an upper centering device 21 comprising bow springs, a hydraulic and mechanical section 22, a folding blade propeller 23 and a protection centering device 24 around the propeller 23. The upper section 20 generally comprises a fluid tight and pressure resistant jacket in which the electric circuits of the apparatus are located. This section may also include, besides the electric circuits of the flowmeter, several other measurement devices such as, for instance, a densimeter or fluid density measuring device and other measurement apparatus such as apparatus for measuring the dynamic proportions of a phase, water, for instance, or the flow speed of this phase.

Figure 2A:
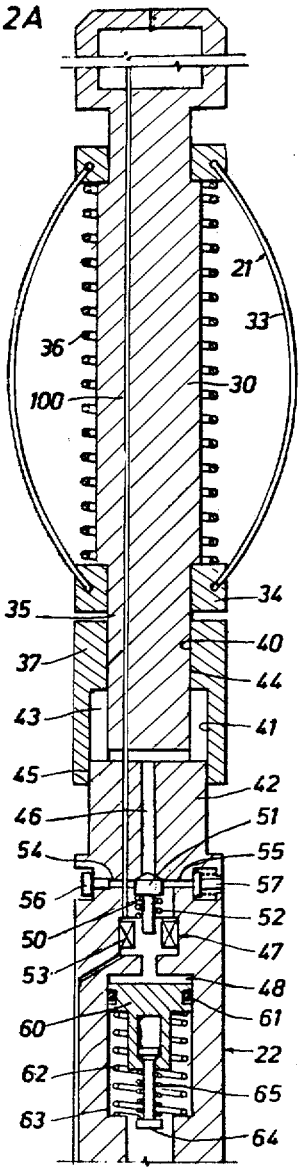
FIGS. 2A and 2B are longitudinal cross sections of the apparatus of FIG. 1, FIG. 2A representing the upper part and FIG. 2B the lower part.
Figure 2B:
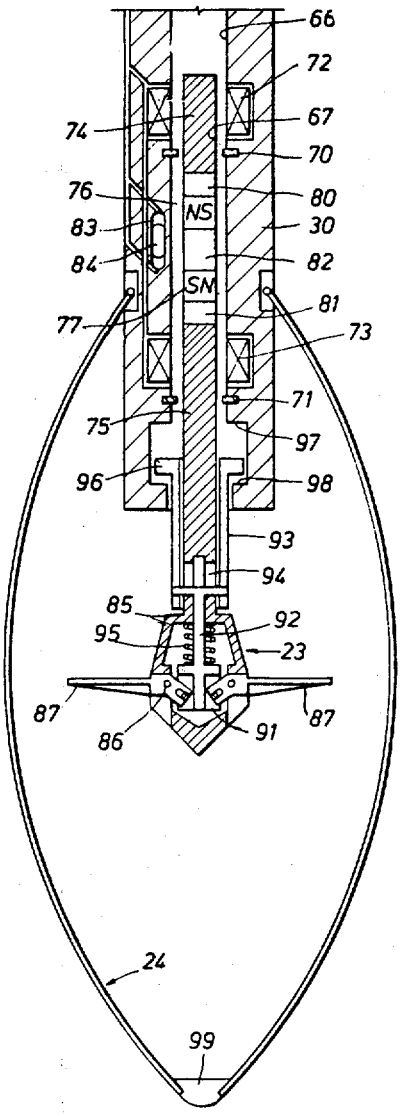

The cable 12 passes over a pulley 25 and is connected to surface equipment 26 which serves, on the one hand, to roll and unroll cable 12 in a conventional manner, and on the other hand, to process and record the signals coming from the probe 10 which is shown in more detail in FIGS. 2A and 2B.

Referring to FIG. 2A, the probe 10 includes a body member 30 at the upper part of which is mounted a rotary ring 31, placed inside an annular groove 32. On this ring 31, curved spring blades or bow springs 33 are arranged regularly around the body 30. The bow springs 33 are also articulated at their lower end on a second rotary ring 34 which can slide on the body member 30 along a cylindrical part 35 of small diameter. A helical spring 36 can be mounted in extension between the two rings 31 and 34 so as to obtain a centering device with a constant bearing pressure as described in the U.S. Pat. No. 3,097,433.

On the cylindrical part 35 of the body 30 a ringlike compression piston 37 can also slide. This piston has two coaxial bores, each of different diameter. The upper bore 40, of smaller diameter, fits onto the cylindrical part 35; and the lower bore 41, of greater diameter, fits onto another cylindrical part 42 of the body member 30 thus defining, between the cylindrical part 35 and the piston 37, an annular chamber 43 which is filled by a hydraulic fluid. This chamber is sealed by two O-rings 44 and 45, placed respectively on the cylindrical portions 35 and 42. At the base of the hydraulic chamber 43 is a passage 46 which communicates through a solenoid valve 47 with a cylinder 48. The solenoid valve 47 is placed in a housing 50 and includes a valve 51 which closes the opening of the passage 46 under the action of the spring 52 so as to permit the hydraulic fluid to flow from the chamber 43 towards the cylinder 48, but prevents fluid flow in the opposite direction. The valve 51 can also be held open by applying a current to a solenoid 53. The upper part of the housing 50 communicates with the outside by two openings 54 and 55. The opening 54 which serves as a filling port for the hydraulic fluid is closed by a screw plug 56. The opening 55 is closed by a safety valve 57 which opens when the hydraulic pressure inside the apparatus exceeds a predetermined threshold value.

Inside the cylinder 48 a control piston 60 is slidably mounted. The piston 60 is sealed by an O-ring 61. This piston is urged upwards by a helical spring 62 supported by a shoulder 63 of body 30. A second piston 64 may slide in the control piston 60, the helical spring 65 pushing the second piston 64 downwardly with respect to the first one.

At the lower part of the probe, shown in FIG. 2B, the body 30 has a central bore 66 opening towards the bottom and in which is mounted a shaft 67 holding the folding blade spinner or screw 23. The inside of the bore 66 is equipped with two centering bearings 70 and 71 surrounding the shaft 67 with considerable clearance and two suspension coils 72 and 73 longitudinally separated from each other. The shaft 67 consists of several cylindrical sections having the same diameter but made of different material. Two upper and lower sections 74 and 75, located respectively opposite coils 72 and 73 are made of ferromagnetic metal so that their centers are below the center horizontal plane of each coil. Each of these sections is thus submitted to an upward force when coils 72 and 73 are supplied with current. The central part of shaft 67 consists of two permanent magnets 76 and 77 magnetized radially and mounted in opposition so that the North pole of one is on the same generatrix of the cylinder as the South pole of the other. Magnets 76 and 77 are respectively separated from upper section 74 and lower section 75 by nonmagnetic spacers 80 and 81. A nonmagnetic median spacer 82 also separates the two magnets from each other.

Approximately opposite the spacer 82, the body member 30 has a housing 83 in which is found a reed relay 84 actuated, in operation, by the rotation of magnets 76 and 77 as will be subsequently explained. Several relays may be placed in the area of body 30 surrounding the median spacer to enable the detection of the direction of roation of the shaft 67 if desired.

At the lower part of shaft 67 a measuring screw or propeller body 85 is mounted. The body 85 has pivots 86 on which are articulated four blades 87 arranged regularly around the axis of the body. The inner ends of the blades 87 are bent downwardly in the position shown and have [ slats ] *slots* 90 which fit into a crossing 91 connected by a transmission rod 92 having a "T" shape to a sleeve 93 surrounding the lower part of the shaft 67. The transmission rod 92 passes through longitudinal spline grooves 94 in the shaft 67 so that the unit constituted by crossing 91, rod 92 and sleeve 93, may move longitudinally with respect to the shaft 67. This whole unit is pushed downwards by a helical spring 95 which thus maintains the blades 87 in their unfolded position. The upper part of the sleeve 93 forms a rim 96 which is maintained in the body between an upper stop 97 and a lower stop 98. The centering device 24 is formed by curved spring blades arranged regularly around the screw and joined together on an end piece 99.

The suspension coils 72 and 73, the reed relay 84 and the solenoid 53 are electrically connected to the cable and thence to the surface by apparatus contained in the upper part 20 of the tool body by insulated conductors 100.

In operation, and during a flow measurement in a well bore, the differenet parts of the apparatus have the position represented in FIGS. 1 and 2. Current is supplied to the solenoid 53 which opens the valve 51. The same current also goes into coils 72 and 73 which exert an upward electromagnetic force on cross section 74 and 75 of the screw shaft. The screw is thus suspended with minimal friction, the rim 96 being between stops 97 and 98. The screw turns under the action of the fluid flowing in the well and its speed of rotation is measured by means of the relay 84 which closes twice per screw turn. The electrical circuit used in the power supply and in the meaurement are described below.

During the measurement the probe is moved through the well bore in a continuous manner. If the apparatus encounters a bottle neck, as for example, the production tubing string 17, the upper centering device 21 closes and the ring 34 pushes the compression piston 37 down. The hydraulic fluid flows in passage 46 through the housing 50, since the valve 51 open permanently, and pushes the control piston 60 downward. The second piston 64 presses on the upper face of shaft 67 and pushes it towards the bottom. When the rim 96 comes into contact with the lower stop 98, the sleeve 93 and the crossing 91 are immobilized with respect to the body of the apparatus. The shaft 67, in its downward movement, compresses spring 95 and blades 87 close following the relative movement of the screw hub 85 with respect to the crossing 91. The blades of the screw open if the upper centering device 21 returns to its spread position.

To keep the blades closed, for example during the descent of the apparatus into the borehole, no current is passed through the [ coil winding ] *solenoid* 53 thus freeing valve 51. The hydraulic fluid can no longer rise in passage 46 and the control piston 60 remains in the lower position maintaining the screw blades closed. The compression piston 37 also remains in the lower position but due to the separation between this piston 37 and the ring 34, the movement of the upper centering device is independent and the apparatus remains perfectly centered.

Figure 3:
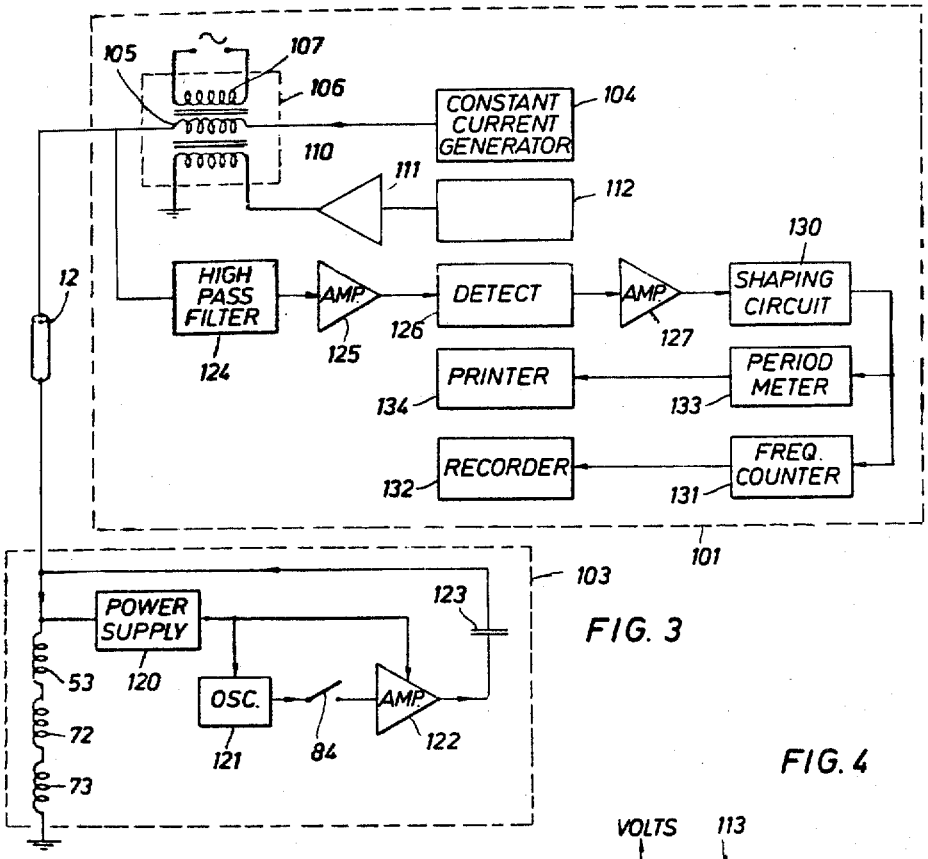
FIG. 3 is a simplified diagram of the electrical circuits of the apparatus of FIG. 1.

Referring now to FIG. 3, the electrical circuits of the apparatus are shown. These circuits include the solenoid 53, coils 72 and 73 and the reed relay 84 represented schematically. Generally, the surface circuits 101 are connected by a conductor 102 of cable 12 to downhole circuits 103 which are contained in the probe of FIG. 2. In the surface circuits 101, a DC constant current generator 104 is connected in series with the secondary 105 of a transformer 106 having two primary windings 107 and 110. The primary winding 107 is connected to the terminals of a 60 Hz. generator for instance, the primary winding 110 being connected on the one hand to the ground and on the other hand to the output of an amplifier 111 whose input is connected to a very low-frequency (a few Hz.) generator 112. The output signal from the secondary 105 thus has a DC component, and an AC component at 60 Hz. and a very low-frequency AC component. This *output* signal is applied through conductor 102 of cable 12 to the solenoid 53 and the coils 72 and 73.

Figure 4:
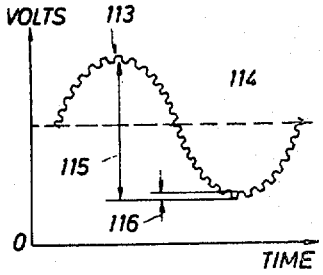
FIG. 4 gives the shape of an electrical signal applied to the apparatus.

This signal, whose wave form 113 is shown in FIG. 4, is applied to coils 72 and 73 so as to give shaft 67 a back and forth complex vertical motion which enables lowering the rotation threshold of the screw. The average upward force applied to shaft 67 depends on the DC component 114 which is chosen in such a way that, taking into account the weight of the rotary unit, the rim 96 is held between the two stops 97 and 98 as shown in FIG. 2B. The low-frequency AC component 115 and the component at the frequency of the mains 116 respectively gives the shaft a swaying motion and a vibrating motion around its equilibrium position which considerably reduces any static forces of friction remaining, for instance, on the journal bearings 70 and 71.

Referring again to FIG. 3, the downhole circuits 103 include a roughly stabilized power supply 120 which is connected to conductor 102 and supplies voltage necessary to the operation of a relatively high-frequency oscillator 121 and of an amplifier 122. The oscillator 121 supplies a signal of audiofrequency, 2,000 to 5,000 Hz. for instance, which is controlled by the reed relay 84 and then applied to the conductor 102 of the cable through the amplifier 122 and a coupling capacitor 123.

The modulated signal produced by the turning shaft is transmitted to the surface through a high-pass filter 124 to an amplifier 125. The carrier frequency is eliminated by a detector 126 connected to an amplifier 127. Amplifier 127 is connected to a shaping circuit 130. The output signal of the shaping circuit 130 is a pulse train, the frequency of which is proportional to the speed of rotation of the screw. This pulse train is applied to a period meter 133 which is in turn connected to a printer 134. The pulse train is also applied to a [ frequency to ] *frequency-to-*voltage counter 131 which is connected to a recorder 132 of the galvanometric type. These two recording methods enable covering the extensive dynamic range of the frequencies encountered.

In operation, it will be recalled that the rotation of the shaft 67 opens each reed relay 84 twice per revolution. While relay 84 is closed the amplified output of the audiofrequency oscillator 121 is coupled to the conductor 102 of cable 12 and transmitted to the surface. At the surface this signal is separated from the other relatively low-frequency components on the conductor 102 by high-pass filter 124 and applied to the detector 126. Thus the input to detector 126 consists of variable frequency bursts of audiofrequency signals from the downhole oscillator 121 whose frequency is proportional to the speed at which the shaft 67 is rotating.

The detector circuit 126 provides a DC pulse output whose frequency is equal to that of the burst from the downhole oscillator. This pulse output is applied to the shaping circuit 130 where it is used to gate an oscillator of known frequency which produces sharp pulses suitable for counting by the frequency counting circuit 131 and for integration by the period meter circuit 133. These latter two circuits then provide two measurements of the speed of rotation of the shaft 67 in the downhole tool.

Figure 6:
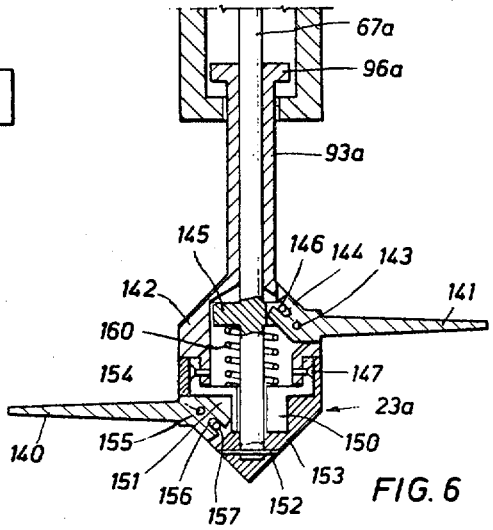
FIG. 6 is a cross section along the line 6—6 of FIG. 5.
Figure 7:
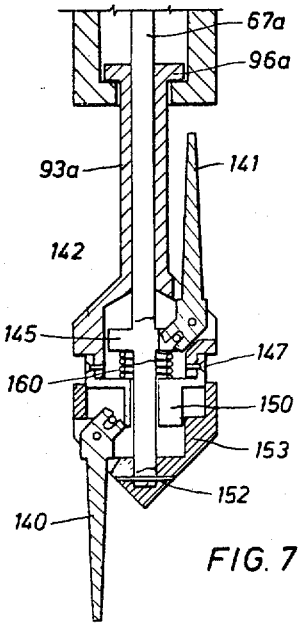
FIG. 7 is a cross section analogous to that of FIG. 6, in which the blades are shown in a closed position.
Figure 5:
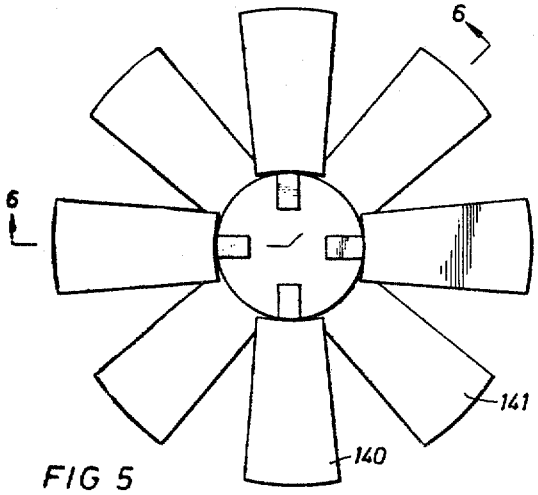
FIG. 5 is a view from underneath an eight blade measuring screw which may be used in the apparatus.

Referring now to FIGS. 5–7, variations of the downhole probe are shown. Instead of automatically closing the screw blades by the centering device, a surface controlled hydraulic system may also be provided. The annular piston 37 (of FIG. 2A) is thus eliminated and passage 46 would, for instance, be connected with an electrical pump controlled from the surface through cable 12. It would then be sufficient to send a current into this pump to close the screw blades.

In the same way, instead of using a four blade screw or spinner such as the one described above, an eight blade screw could be mounted as shown in more detail in FIGS. 5 to 7. Such a screw, whose surface area is much greater, produces greater torque and a better polyphasic fluid flow sampling.

Referring to FIGS. 5 and 6, the screw 23a includes a shaft 67a which may slide in a sleeve 93a the upper end of which forms a ring 93a. This screw has two superimposed sets of folding blades, each set consisting of 4 blades arranged at 90° around the rotation axis of the screw and the blades 141 of the upper set being shifted by 45° with respect to the blades 140 of the lower set. The lower part of the sleeve 93a widens to form a hollow screw body 142 on which the upper blades are articulated by pivots 143. These upper blades have a bent end in which there is a groove 144. These bent ends fit into radial cuts made in a rim 145 in shaft 67a. Cotter pins 146 set in rim 145 fit in groove 144 so that a relative motion of shaft 64a with respect to sleeve 93a makes the blades 141 turn around their pivots 143.

Screws 147 fasten a ring 150 to body 144. The lower part of ring 150 is of smaller diameter and has four cuts 151 arranged regularly around the longitudinal axis. The lower end of shaft 67a is attached by a cotter pin 152 to a conical cap 153 cut out on the inside so that it fits the ring 150. The lower blades 140, articulated on the cap 153 by pivot 154, have a bent internal end 155 in which there is a slot 156. Cotter pins 157, set in the ring 150 and going through the cuts 151, fit into each slot 156 of the internal end of the blade. A spring 160 is compressed between the ring 150 and the rim 145 of the shaft 67a.

In the measurement position, (i.e., when the shaft 67a is raised by the electromagnetic suspension described above), the spring 160 pushes the ring 150 away from the rim 147 and the blades attain the spread out blade position shown in FIG. 6. It will be noticed that the two sets of blades close in opposite directions, and the fluid whose velocity is being measured does not have a tendency to close the screw no matter what the flow direction may be. If a downward force is exerted on shaft 67a by means of piston 55 (FIG. 2A), rim 96a comes to stop in the body of the probe and the shaft 57a moves towards the bottom with respect to the sleeve 93a. The rim 145 goes downwards with respect to the screw body 142 closing the upper blades 141 toward the top. In the same way the cap 153 goes downward with respect to the ring 150 closing the lower blade 140 towards the bottom. The easy dismantling of the lower subassembly of the screw will also be noticed. This may be performed by simply removing screws 147 and the cotter pin 152.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. Apparatus for measuring fluid flow rate in a well borehole comprising:

a body member sized for passage through a well bore;

a longitudinal shaft member rotatably mounted in said body member so that it is also free to undergo limited motion along the direction of the longitudinal axis of said body member, said shaft member having at least a portion of its length comprised of ferromagnetic material and having an end portion extending exteriorly to said body member;

a measuring screw system including a plurality of foldable blades carried on the exterior portion of said shaft member together with means for folding and unfolding said blades; and solenoid means mounted in said body member and adjacent said shaft member so that an electrical current flowing in said solenoid interacts with said ferromagnetic portion of said shaft to suspend it free of touching engagement with any supporting member.

2. The apparatus of claim 1 wherein said shaft member passes axially through said solenoid and the ferromagnetic portion of said shaft member is effectively longitudinally aligned with the interior of said solenoid.

3. The apparatus of claim 1 and further including means for supply AC and DC currents to said solenoid so that the DC component supplies an average suspension force to said shaft member and an AC component imparts a relatively low-frequency longitudinal oscillatory motion of said shaft around the average suspension position.

4. The apparatus of claim 3 wherein said AC currents comprise two AC components, a relatively low-frequency component and a higher frequency component, said low-frequency component supplying a relativley low-frequency longitudinal oscillatory motion of said shaft around the average suspension position, and said higher frequency component imparting a more rapid vibratory motion to said shaft as it slowly oscillates about the average suspension position.

5. The apparatus of claim 1 wherein said blades are pivotally mounted on said shaft, and said means for folding and unfolding said blades comprises a sleeve member slidably mounted about a longitudinal portion of said shaft and means for causing a relative longitudinal displacement of said sleeve with respect to said shaft thereby engaging said sleeve with a portion of said blades and effecting folding of said blades about their pivotal mounts.

6. Apparatus for measuring fluid flow rate in a well bore comprising:

a body member sized for passage through a well bore;

bow spring means mounted on said body member for centering said body member in the well bore;

a longitudinal shaft member rotatably mounted in said body member so that it is also free to undergo limited motion along the direction of the longitudinal axis of said body member, and shaft member having at least a portion of its length comprised of a ferromagnetic material;

a measuring screw system comprising a plurality of foldable blades pivotally mounted on said shaft member;

a sleeve member slidably mounted about a longitudinal portion of said shaft so that a relative longitudinal displacement of said sleeve with respect to said shaft causes engagement of said sleeve with a portion of said blades and thereby effects folding of said blades about their pivotal mounts; and hydraulic piston means coupled to said bow spring means and to said sleeve member by a hydraulic transmission system in such a manner that if the diameter of the well bore is smaller than a predetermined value, deflection of said bow springs causes movement of said hydraulic piston means which acts upon said hydraulic transmission system to cause the aforesaid motion of said sleeve member thereby folding said blades.

7. The apparatus of claim 6 and further including solenoid coil means mounted in said body member and adjacent said shaft member in such a manner that an electrical current flowing in said coil is capable of interacting with the ferromagnetic portion of said shaft to suspend it free of touching engagement with said body member.

8. The apparatus of claim 6 wherein said hydraulic transmission system is controlled by an electrically operated valve.

9. Apparatus for measuring fluid flow rates in a well borehole comprising:

a body member sized for passage through a well bore;

a longitudinal shaft member having at least a portion of its length composed of a ferromagnetic material rotatably mounted in said body member, the mounting also allowing limited longitudinal motion of said shaft member;

means for magnetically suspending said shaft member free of touching engagement with any supporting member;

foldable blade means carried on said shaft member and exterior to said body member for engaging fluid moving in the well bore and imparting a rotational motion to said shaft member;

means for generating electrical signals representative of the speed of rotation of said shaft member;

means for transmitting said signals to the surface of the earth;

means for demodulating and shaping said signals; and means for displaying the signals so processed.

10. The apparatus of claim 9 wherein said means for generating electrical signals includes high-frequency oscillator means mounted in said body member and means coupled to said shaft member for alternately connecting and disconnecting the output of said oscillator to said transmitting means at a speed proportional to the rate of rotation of said shaft member thereby producing bursts of output signals from said oscillator whose time duration is proportional to the speed of rotation of said shaft.

11. The apparatus of claim 10 wherein said means for demodulating and shaping said signals comprises high-pass filter means for separating said oscillator signals from other signals present on said transmitting means, together with means for generating signals representative of the time duration of the bursts of output signals from said oscillator.

*12. Apparatus for measuring fluid flow rate in a well bore comprising:*

*a body member sized for passage through a well bore;*

*bow spring means mounted on said body member for centering said body member in the well bore;*

*a longitudinal shaft member rotatably mounted in said body member;*

*a measuring screw system comprising a plurality of foldable blades pivotally mounted on said shaft member;*

*a sleeve member slidably mounted about a portion of said shaft so that relative longitudinal displacement of said sleeve with respect to said shaft causes engagement of said sleeve with a portion of said blades and thereby effects folding of said blades about their pivotal mounts; and*

*means coupling said bow spring means to said sleeve member and cooperatively arranged in such a manner that if the diameter of the well bore is smaller than a predetermined value, deflection of said bow springs causes the aforesaid motion of said sleeve member thereby folding said blades.*

*13. Apparatus for measuring fluid flow rates in a well borehole comprising:*

*a body member sized for passage through a well bore;*

*bow spring means mounted on said body member for centering said body member in the well bore;*

*a longitudinal shaft member rotatably mounted in said body member;*

*foldable blade means pivotally mounted on said shaft member and exterior to said body member for engaging fluid moving in the well bore and imparting a rotational motion to said shaft member;*

*a sleeve member slidably mounted about a portion of said shaft so that relative longitudinal displacement of said sleeve with respect to said shaft causes engagement of said sleeve with said foldable blade means and thereby effects folding of said blade means about their pivotal mounts;*

*means coupling said bow spring means to said sleeve member and cooperatively arranged in such a manner that if the diameter of the well bore is smaller than a predetermined value, deflection of said bow springs causes the aforesaid motion of said sleeve member thereby folding said blade means;*

*means for generating electrical signals representative of the speed of rotation of said shaft member;*

*means for transmitting said signals to the surface of the earth;*

*means for demodulating and shaping said signals; and means for displaying the signals so processed.*

*14. The apparatus of claim 13 wherein said means for generating electrical signals includes high frequency oscillator means mounted in said body member and means coupled to said shaft member for alternately connecting and disconnecting the output of said oscillator to said transmitting means at a speed proportional to the rate of rotation of said shaft member thereby producing bursts of output signals from said oscillator whose time duration is proportional to the speed of rotation of said shaft.*

*15. The apparatus of claim 14 wherein said means for demodulating and shaping said signals comprises high pass filter means for separating said oscillator signals from other signals present on said transmitting means, together with means for generating signals representative of the time duration of the bursts of output signals from said oscillator.*

*16. Apparatus for measuring fluid flow rate in a well bore comprising:*

*a body sized for passage through a well bore;*

*bow spring means mounted on said body for centering said body in the well bore;*

*a longitudinal shaft member rotatably mounted with respect to said body;*

*a measuring screw system comprising a plurality of foldable blades pivotally mounted on said shaft member;*

*an actuator member slidably mounted relative to said shaft member so that relative longitudinal displacement of said actuator member in one direction with respect to said shaft member causes engagement of said actuator member with a portion of said blades and thereby effects folding of said blades about their pivotal mounts; and*

*means coupling said bow spring means to one of said members and cooperatively arranged in such a manner that if the diameter of the well bore is smaller than a predetermined value, deflection of said bow springs causes the aforesaid relative displacement of said actuator member in one direction with respect to said shaft member thereby folding said blades.*

*17. The apparatus of claim 16 further comprising biasing means between said actuator member and said shaft member for urging said actuator member relative to said shaft member in a direction opposite said one direction to cause said blades to unfold.*

*18. The apparatus of claim 16 further comprising selectively operable means for maintaining said one member upon said relative displacement of said actuator member with respect to said shaft member in said one direction, thereby locking said blades in a folded position.*

*19. Apparatus for measuring fluid flow rates in a well borehole comprising:*

*a body sized for passage through a well bore;*

*bow spring means mounted on said body for centering said body in the well bore;*

*a longitudinal shaft member rotatably mounted with respect to said body;*

*foldable blade means pivotally mounted on said shaft member and exterior to said body member for engaging fluid moving in the well bore and imparting a rotational motion to said shaft member;*

*an actuator member slidably mounted relative to said shaft member so that relative longitudinal displacement of said actuator member with respect to said shaft member causes engagement of said actuator member with said foldable blade means and thereby effects folding of said blade means about their pivotal mounts;*

*means coupling said bow spring means to one of said members and cooperatively arranged in such a manner that if the diameter of the well bore is smaller than a predetermined value, deflection of said bow springs causes the aforesaid relative displacement of said actuator member with respect to said shaft member thereby folding said blade means;*

*means for generating electrical signals representative of the speed of rotation of said shaft member;*

*means for transmitting said signals to the surface of the earth;*

*means for demodulating and shaping said signals; and means for displaying the signals so processed.*

*20. The apparatus of claim 19 wherein said means for generating electrical signals includes high frequency oscillator means mounted in said body member and means coupled to said shaft member for alternately connecting and disconnecting the output of said oscillator to said transmitting means at a speed proportional to the rate of rotation of said shaft member thereby producing bursts of output signals from said oscillator whose frequency is proportional to the speed of rotation of said shaft.*

*21. The apparatus of claim 20 wherein said means for demodulating and shaping said signals comprises high pass filter means for separating said oscillator signals from other signals present on said transmitting means, together with means for generating signals representative of the frequency of the bursts of output signals from said oscillator.*

* * * * *